United States Patent [19]

Speakman

[11] 4,059,547

[45] Nov. 22, 1977

[54] PAINT MANUFACTURE

[75] Inventor: Derek Norman Alfred Speakman, Ruislip, England

[73] Assignee: Imperial Chemical Industries Limited, United Kingdom

[21] Appl. No.: 580,348

[22] Filed: May 23, 1975

Related U.S. Application Data

[62] Division of Ser. No. 242,803, April 10, 1972, abandoned.

[30] Foreign Application Priority Data

Apr. 15, 1971 United Kingdom ............... 9494/71

[51] Int. Cl.$^2$ ............................................. C08K 9/04
[52] U.S. Cl. ............................. 260/17 R; 260/23 R; 260/33.6 UA; 260/37 EP; 260/37 N; 260/39 R; 260/40 R; 260/42.21; 260/42.24; 260/42.28; 260/42.29; 260/42.52; 526/16
[58] Field of Search ............... 260/80.73, 80.75, 80.81, 260/42.52, 17 R, 40 R, 42.28, 42.29, 39 R; 526/16

[56] References Cited

U.S. PATENT DOCUMENTS

| | | | |
|---|---|---|---|
| 3,230,275 | 1/1966 | Sekmakas | 260/873 |
| 3,399,152 | 8/1968 | Jamrog et al. | 260/17 |
| 3,433,753 | 3/1969 | Farkas et al. | 260/42.52 |
| 3,674,734 | 7/1972 | Parker | 260/33.4 R |
| 3,728,295 | 4/1973 | Skinner | 260/80.7 S |

Primary Examiner—James H. Derrington
Attorney, Agent, or Firm—Cushman, Darby & Cushman

[57] ABSTRACT

A pigment dispersant suitable for use in making a series of paints, the dispersant being a copolymer of defined proportions of ethylenically unsaturated monomers containing hydroxy and/or amide groups, straight or branched chain alkyl groups of from 7 to 22 carbon atoms and optionally also groupings which can promote association of the copolymer with a pigment surface. A millbase made with the aid of such a dispersant can be combined in either loading or tinting operations with a wide range of different film-forming polymers.

12 Claims, No Drawings

PAINT MANUFACTURE

This is a division of application Ser. No. 242,803 filed Apr. 10, 1972, now abandoned.

This invention relates to the manufacture of paint.

Paints usually comprise as fundamental constituents a film-forming polymer and a pigment, although a wide range of other constituents are frequently present, for example volatile solvents, coalescing liquids, plasticisers, crosslinking agents and fillers. It is important that the pigment is satisfactorily dispersed throughout any film produced from a paint since only in this way can the pigment properties be utilised to the fullest extent. The pigment should preferably be present in such a form that it contributes the optimum opacity or colour to the film. It is therefore desirable, in order to make the best use of pigment, that the pigment is well dispersed throughout the paint when made and is stable towards storage, so that each particle of pigment will contribute fully towards the opacity or colour of any ultimate film produced from the paint.

Conventionally, the pigment to be used in a paint is first dispersed with only a portion of the total film-forming polymer of which the paint is to be comprised, together with appropriate solvents, diluents or other additives, in a ball mill or other type of mill such as is used in the paint industry. This resulting dispersion or "millbase" is then mixed with the remainder of the film-forming polymer and any other necessary ingredients to produce the paint. In the case of an alkyd resin-based paint, for example, the pigment is first dispersed by ball-milling with a portion of the alkyd resin in the presence of a hydrocarbon liquid, and the product is then further diluted with the remainder of the alkyd resin and any other necessary ingredient. Frequently mixtures of millbases are blended with the film-forming polymer to give the desired colour, and this method of manufacture is hereinafter referred to as "loading". The colour of the final paint is also normally adjusted by small further additions of coloured millbases containing the same or similar film-forming polymer, which is referred to herein as "tinting".

A wide range of different film-forming polymers is used in the manufacture of different paints and, using the conventional procedure described above, it is necessary to pre-disperse pigment with a portion of the film-forming polymer, or a polymer compatible therewith, which is appropriate to each type of paint. Thus, even though the pigmentation of two paints comprised of different film-forming polymers may be identical, it has hitherto been necessary to disperse each pigment or mixture of pigments separately with the appropriate film-forming polymer at the millbase stage, in order to avoid any problems of incompatibility in the final paints between the dispersant polymer and the film-forming polymer. Similarly, any tinting operation calls for the use of dispersants which are compatible with the film-forming polymer in question.

We have now found that a certain class of dispersant polymers have the surprising property that pigment millbases prepared with any one of them may be combined with a wide range of different film-forming polymers to produce paints.

According to the present invention we provide a pigment dispersant suitable for use in making a series of paints, the dispersant being a copolymer comprising units derived from the following ethylenically unsaturated monomers in the stated proportions by weight based on the total weight of the copolymer:-
   a. 0 – 50% of a hydroxy group-containing monomer, and/or
   b. 0 – 20% of an amide group-containing monomer, provided that there is always present at least 5% of (a) or (b);
   c. 20 – 80% of a monomer free from carboxyl groups and containing a straight or branched chain alkyl group of from 7 to 22 carbon atoms, and
   d. 0 – 50% of one or more monomers free from the groups mentioned in (a), (b) or (c), the total of monomers being 100%.

It is essential that there is always a minimum proportion, namely 5%, of either the hydroxy group-containing monomer (a) or the amide group-containing monomer (b). Preferably both types of monomer are present, since the range of film-forming polymers with which millbases prepared with the dispersant copolymer may be combined is thereby increased, and since these groups also improve pigment dispersion, but when limited ranges of film-forming polymers are involved it may suffice to use only either (a) or (b). Suitable hydroxy-group-containing monomers include hydroxyethyl methacrylate, hydroxy isopropyl methacrylate and the corresponding acrylates. Suitable amide-group containing monomers include acrylamide and methacrylamide.

The comonomer (c), the presence of which in the copolymer is essential, may be, for example, an alkyl methacrylate or acrylate in which the alkyl group contains from 7 to 22 carbon atoms, such as lauryl methacrylate or 2-ethylhexyl acrylate, or an alkene containing from 7 to 22 carbon atoms.

The comonomers (d) are optional components of the copolymers of the invention, but at least one such comonomer is normally desirable in order to permit spacing of the functional groups carried by monomers (a), (b) and (c) in the copolymer. Suitable such monomers include, for example, styrene, vinyl toluene, acrylonitrile and alkyl acrylates and methacrylates in which the alkyl group contains from 1 to 6 carbon atoms, such as butyl methacrylate. The monomer (d) may be free from all reactive groups; it is essential that it is free from groups which will tend to react with the hydroxy or amide groups present in the other components of the copolymer under the conditions of formation of the copolymer.

Particularly suitable combinations of monomer to provide the dispersant polymer are:-
   a. 15 – 30% of a hydroxy alkyl methacrylate, or corresponding acrylate, e.g. where alkyl is ethyl, propyl, isopropyl or butyl,
   b. 1 – 10% of acrylamide or methacrylamide,
   c. 20 – 80% of $C_7$ or higher alkyl acrylate or methacrylate, and
   d. 10 – 50% of styrene or vinyl toluene, although many other combinations of monomers are possible.

The dispersant copolymers of the invention may conveniently be made by conventional solution polymerisation of the mixture of constituent monomers in an inert solvent, such as xylene, in the presence of a suitable initiator. A technique in which the monomers are gradually fed into the polymerising material is preferred to a "one-shot" procedure in which the whole of the monomers are present at the start of the polymerisation.

Whilst the dispersant copolymers as defined above are useful dispersants for a wide range of pigments and film-forming polymers, their performance can be improved by the presence therein of modifying chemical groups which are known to improve affinity for the pigment surface. According to a preferred embodiment of the invention, therefore, the dispersant copolymers hereinbefore defined are modified by the incorporation into the copolymer of a grouping which is capable of promoting association of the copolymer with the surface of a pigment. Such a modifying group may be introduced after copolymerisation of the monomers specified, for example by reaction of a compound containing the associating group, or a precursor thereof, with functional groups present in the copolymer as defined above. Alternatively, the dispersant copolymer may be prepared by including as a comonomer (d) a further monomer which contains a group having pigment dispersant characteristics. As a further alternative, in the preparation of the dispersant copolymer there may be employed a minor proportion of a comonomer (d) which contains a group capable of reacting with a compound which contains a complementary reactive group and which also provides the desired group having pigment dispersant characteristics. Preferably there is used not more than 20% of this further comonomer based on the total weight of copolymer.

A particularly suitable further comonomer for use in the preparation of the dispersant polymer is a monomer which bears an epoxide groups, for example glycidyl acrylate, glycidyl methacrylate or allyl glycidyl ether. The epoxide groups thus introduced into the copolymer may be then reacted with a compound bearing both a carboxyl group and a group having pigment dispersant characteristics, in order to introduce into the dispersant polymer the desired dispersant group. Preferably the copolymer contains not more than 10% of the epoxide-containing monomer based on the total weight of copolymer. Particularly suitable pigment dispersant groups which can be introduced into the dispersant copolymer in this way are those obtained by reacting an epoxide groups present in the copolymer with a compound of structure

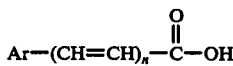

wherein Ar is an aromatic group and $n$ is 1 or 0, in the presence of a tertiary amine. The group Ar is preferably phenyl and may contain a wide range of substituents, such as nitro and amino groups; examples of suitable compounds include p-amino benzoic acid and p-nitro benzoic acid. Further details of these dispersant groups are provided in our U.S. Pat. No. 3,433,753, the description of which is incorporated herein by reference. Similarly, as described in our U.S. Pat. No. 3,505,268, the description of which is also incorporated herein by reference, the introduction of suitable pigment dispersant groups can be effected by reacting an epoxide group in the copolymer with a compound of structure

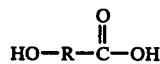

wherein R is an aliphatic radical which may contain one or more additional hydroxyl groups, in the presence of a tertiary amine.

The aforementioned pigment dispersant groups may with advantage be modified by reaction with an organic monoisocyanate, as described in our British Patent Applications Nos. 42760/70 and 54130/70.

Other suitable comonomers (d) which may be used in the preparation of the dispersant copolymer, in order to introduce therein either directly or by subsequent reaction a group having pigment dispersant characteristics, include the following, the percentages stated being based on the total weight of the copolymer:- i. up to 10% of an epoxide group-bearing monomer which is subsequently reacted with a polybasic inorganic acid which may or may not thereafter be partially neutralised with a suitable base, or with a partial ester of a polybasic organic acid, or with an amine;

ii. up to 20% of an amine group-bearing monomer;

iii. up to 20% of an amine group-bearing monomer which is at least partially reacted with propane sultone;

iv. up to 20% of an amine group-bearing monomer which is at least partially reacted with an alkyl halide;

v. up to 20% of a carboxylic acid group-bearing monomer;

vi. up to 10% of a carboxylic acid group-bearing monomer at least partially neutralised with a base;

vii. up to 10% of a carboxylic acid group-bearing monomer at least partially reacted with ethylene imine;

viii. up to 20% of an amide group monomer reacted with formaldehyde and esterified with a lower aliphatic alcohol.

The dispersant copolymers of the invention permit the prior preparation of dispersions of pigments or pigment mixtures used in paint manufacture, each of which dispersions may subsequently be employed for the direct pigmentation of paints based on a wide range of different film-forming polymers. The pigment dispersions may be prepared at any convenient time and stored for future use in whichever particular paint formulation within that range may be required.

Thus according to a further feature of the present invention, we provide a method of manufacturing a series of paints all of which have a pigment or a mixture of pigments in common and at least two of which comprise different film-forming polymers, the method comprising first dispersing the pigment or mixture of pigments in the presence of a dispersant copolymer as hereinbefore defined, and subsequently combining the dispersion so obtained with the film-forming polymer appropriate to each paint of the series.

The method of the invention offers the possibility of rationalising the manufacture of a range of paints by substantially reducing the number of different types of millbase which it is necessary to produce both for loading and for tinting operations.

Film-forming polymers used in the paint industry, for example in the formulation of automotive, refinish and industrial paints, which may be loaded and/or tinted according to the method of the invention include thermosetting acrylic/melamine-formaldehyde resin blends, thermosetting acrylic resins based on acrylamide or methacrylamide, coconut oil alkyd/melamine-formaldehyde and urea-formaldehyde blends, blends of coconut oil alkyds with melamine-formaldehyde and thermosetting acrylamide or methacrylamide-based resins, alkyd/nitrocellulose blends with or without melamine-formaldehyde resins, acrylic polymers of both lacquer and non-aqueous dispersion types, alkyd (dehydrated castor oil/tall oil)/melamine-formaldehyde low bake resins, alkyd (dehydrated castor oil/tall oil)/melamine-formaldehyde/hydroxyacrylic low bake resins, thermosetting acrylic/epoxy blends, alkyd (soya, dehydrated castor or coconut)/melamine-formaldehyde and/or urea-formaldehyde blends, alkyd (soya, dehydrated castor or coconut)/melamine-formaldehyde/urea-formaldehyde/epoxy resin blends, butylated melamine-formaldehyde and urea-formaldehyde resins, epoxy-polyamide blends, chlorinated rubber, short oil alkyds with oil lengths in the range 25 – 45% based on linseed, dehydrated castor or soya oils, short oil alkyds with oil lengths in the range 25 – 50% based on castor oil, hydrogenated castor oil or coconut oils, thermosetting acrylic copolymers based on hydroxy monomers, nitrocellulose finished plasticised with short oil alkyds or with ester plasticisers, epoxy esters and epoxy resins.

Whilst the paints made by the present process may be based on aliphatic or aromatic hydrocarbons or other solvents, it is preferred that they are based on solvents which are predominantly aromatic, e.g. xylene or toluene. Minor amounts of other solvents will often be used in addition.

The pigments employed in the paints manufactured by the present process are those conventionally used industrially and include, for example, the iron oxides, whether black, yellow, red or brown; transparent iron oxides; lead chromate; basic lead silico chromate; strontium chromate; chrome green; chrome oxide green; thio-indigo red; quinacridone; phthalocyanine blue; phthalocyanine green; red lead; cobalt blue; graphite; vegetable carbon black; mineral carbon black; metallic aluminium; metallic lead; metallic zinc; white lead sulphate; white lead carbonate; zinc oxide; rutile titanium dioxide; anatase titanium dioxide; zinc sulphide and zirconium oxide.

In addition to the dispersant polymer and pigment, the millbase may contain additionally other additives, for example, solvents, diluents, and flow control agents.

In combining the pigmented millbases with the various film-forming polymers according to the method of the invention, it is advisable to ensure efficient mixing in order to avoid the risk of "shock" flocculation of the pigment, as is the normal practice in the paint manufacturing industry.

The invention is illustrated by the following Examples, in which parts and percentages are by weight unless otherwise stated.

EXAMPLE 1 a. Preparation of dispersant copolymer

A copolymer of styrene/lauryl methacrylate/butyl methacrylate/hydroxypropyl methacrylate/methacrylamide in the ratios of 28/27/15/25/5 was prepared in xylene as a solution of 50% solids by a conventional addition polymerisation process.

b. Preparation of millbase

A white pigment millbase was prepared by first premixing 8.3 parts of the dispersant copolymer solution as described above, 12.9 parts of xylene and 70.5 parts of titanium dioxide (commercially available as Titanox RA 45, "Titanox" is a Registered Trade Mark) with a Torrance stirrer and then grinding in a Sussmeyer sand mill. Finally a further 3.3 parts of dispersant copolymer solution and 5.0 parts of xylene were added with stirring.

c. Preparation of a series of paints using the millbase (b)

i. The following paint constituents were added to a stirred container in the order given:

| | | |
|---|---|---|
| White millbase (b) | 35.6 | parts |
| Butylated melamine-formaldehyde resin solution (50% solids in xylene/butanol) | 21.7 | parts |
| Alkyd resin of 25% oil length prepared from lauric acid/benzoic acid/trimethylol propane/phthalic anhydride (60% solids in xylene) | 34.3 | parts |
| Butanol | 6.0 | parts |
| Xylene | 2.35 | parts |

From the resulting paint there was produced a stoved finish which had a gloss level meeting the standard appropriate when a portion of the alkyd resin (and optionally of the butylated M/F resin) was used in the millbase rather than the dispersant copolymer (a).

ii. The following paint constituents were added to a stirred container in the order given:

| | | |
|---|---|---|
| White millbase (b) | 38.4 | parts |
| Methylolated acrylamide thermosetting acrylic resi (50% solids in xylene/butanol) | 45.80 | parts |
| "Epikote" 1001 (60% solids solution in xylene/butyl "Cellosolve) ("Epikote" is a Registered Trade Mark) | 4.75 | parts |
| Butyl "Cellosolve" ("Cellosolve" is a Registered Trade Mark) | 3.0 | parts |
| Butanol | 1.8 | parts |
| Xylene | 5.5 | parts |

The resulting paint was a thermosetting acrylic appliance finish from which there was produced a coating film having a gloss level which met the standard appropriate when a portion of the methylolated acrylamide acrylic resin was used in the millbase rather than the dispersant copolymer (a).

iii. The following paint constituents were added to a stirred container in the order given:

| | | |
|---|---|---|
| White millbase (b) | 30.1 | parts |
| Isobutylated melamine-formaldehyde resin (67% solids solution in isobutanol) | 11.0 | parts |
| Styrene/ethyl hexyl acrylate/hydroxy propyl methacrylate/acrylic acid copolymer (50% solids solution in xylene) | 45.9 | parts |
| Methyl ethyl ketone | 3.7 | parts |

The resulting paint was a thermosetting acrylic automotive finish from which there was produced a coating film having a gloss level which met the standard appropriate when a portion of the copolymer was used in the millbase rather than the dispersant copolymer (a).

iv. The following paint constituents were added to a stirred container in the order given:

| | | |
|---|---|---|
| Isopropanol | 7.4 | parts |
| Butanol-damped Nitro cellulose (70% solids nitrocellulose) | 14.4 | parts |
| Methyl ethyl ketone | 4.35 | parts |
| Ethyl acetate | 4.0 | parts |
| Ester gum | 19.5 | parts |

-continued

| | | |
|---|---|---|
| Toluene | 25.4 | parts |
| White millbase (b) | 12.1 | parts |
| Sextol phthalate plasticiser | 3.0 | parts |

The resulting paint was a nitrocellulose-based wood finish which provided a coating film having a gloss level which met the standard appropriate when a portion of the nitrocellulose was used in the millbase rather than the dispersant copolymer (a).

v. The following paint constituents were added to a stirred container in the order given:

| | | |
|---|---|---|
| White millbase (b) | 19.0 | parts |
| Poly(methyl methacrylate) (40% solids solution in toluene/acetone) | 42.8 | parts |
| Cellulose acetate butyrate (25% solids solution in toluene/butyl acetate) | 6.25 | parts |
| Butyl benzyl phthalate | 8.50 | parts |
| Acetone | 2.6 | parts |
| "Cellosolve" acetate | 9.4 | parts |
| Toluene | 4.4 | parts |

The resulting paint was an acrylic lacquer automotive finish which provided a coating film having a gloss level which met the standard appropriate when a portion of the poly(methyl methacrylate) was used in the millbase rather than the dispersant copolymer (a).

EXAMPLE 2 a. Preparation of dispersant copolymer

A copolymer of styrene/lauryl methacrylate/butyl methacrylate/hydroxyisopropyl methacrylate/methacrylamide/glycidyl methacrylate in the ratios 24/27/15/25/5/4 was prepared by conventional addition polymerisation in xylene to give a 50% solids solution. The copolymer was then modified by esterification with p-amino benzoic acid in the presence of dimethyl dodecyl tertiary amine.

b. Preparation of millbase

A white pigment millbase was prepared according to the procedure described in Example 1 (b) but using the modified dispersant copolymer described above in place of the copolymer of Example 1 (a).

c. Preparation of a series of paints from millbase (b)

A series of paints of composition analogous to those described in Example 1 (c) (i) – (v) was prepared, and it was observed that there was some improvement in the gloss of coating films produced from these paints in each case when using the above modified dispersant copolymer instead of the unmodified dispersant polymer of Example 1 (a).

EXAMPLE 3

Similar results to those stated in Example 2 were observed when paints were prepared in an analogous fashion from a white millbase which contained as dispersant a copolymer of styrene/ethyl hexyl acrylate/hydroxy isopropyl methacrylate/methacrylamide/glycidyl methacrylate in the ratios 26/40/25/5/4, modified by esterification with p-amino benzoic acid in the presence of dimethyl dodecyl tertiary amine.

EXAMPLE 4

This Example illustrates the preparation of various coloured millbases and their use in the manufacture of a series of paints:

a. Red oxide millbase

The following constituents:

| | |
|---|---|
| Dispersant copolymer solution of Example 2 (a) | 7.3 parts |
| Xylene | 17.1 parts |
| Red oxide pigment | 60.0 parts | were dispersed for 24 hours in a ball mill; there were then added with stirring:

| | |
|---|---|
| Dispersant copolymer solution | 13.4 parts |
| Xylene | 2.2 parts | b. Copper phthalocyanine blue millbase

The following constituents:

| | |
|---|---|
| Dispersant copolymer solution of Example 2 (a) | 21.4 parts |
| Xylene | 50.0 parts |
| Phthalocyanine blue pigment | 14.4 parts | were dispersed for 24 hours in a ball mill; there were then added with stirring:

| | |
|---|---|
| Dispersant copolymer solution | 12.2 parts |
| Xylene | 2.0 parts | c. Black millbase

The following constituents:

| | |
|---|---|
| Dispersant copolymer solution of Example 2 (a) | 30.8 parts |
| Xylene | 46.5 parts |
| Lamp black pigment | 17.7 parts | were dispersed for 24 hours in a ball mill; there were then added with stirring:

| | |
|---|---|
| Dispersant copolymer solution | 2.5 parts |
| Xylene | 2.5 parts | d. Yellow oxide millbase

The following contituents:

| | |
|---|---|
| Dispersant copolymer solution of Example 2 (a) | 8.26 parts |
| Xylene | 19.60 parts |
| Yellow oxide pigment | 49.90 parts | were dispersed for 24 hours in a ball mill; there were then added with stirring:

| | |
|---|---|
| Dispersant copolymer solution | 20.04 parts |
| Xylene | 2.20 parts | e. Copper phthalocyanine green millbase

The following constituents:

| | |
|---|---|
| Dispersant copolymer solution of Example 2 (a) | 15.40 parts |
| Xylene | 32.70 parts |
| Phthalocyanine green | 16.40 parts | were dispersed for 4 hours in an attritor; there were then added with stirring:

| | |
|---|---|
| Dispersant copolymer solution | 27.20 parts |
| Xylene | 8.30 parts |

1. Blue stoving Car Finish

The following paint constituents were added to a stirred container in the order given:

| | |
|---|---|
| Butylated melamine formaldehyde resin solution (62% solids in butanol) | 11.20 parts |
| White millbase (Example 1 (b)) | 3.15 parts |
| Phthalocyanine blue millbase (Example 4 (b)) | 6.65 parts |
| Black millbase (Example 4 (c)) | 0.10 parts |
| Phthalocyanine green millbase (Example 4 (e)) | 1.20 parts |
| Isobutylated urea formaldehyde resin solution (60% solids in isobutanol) | 5.60 parts |
| Alkyd resin of 39% oil length prepared from coconut oil/pentaerythritol/ glycerol/phthalic anhydride (55% solids solution in toluene/xylene) | 56.60 parts |
| Dipentene | 10.00 parts |
| Isobutanol | 3.40 parts |
| 2% solution of a silicone oil in xylene | 0.10 parts |
| Xylene | 2.00 parts |

2. Dark Grey General Industrial Finish

The following paint constituents were added to a stirred container in the order given:

| | |
|---|---|
| Butylated urea formaldehyde resin solution (53% solids in xylene/butanol) | 40.00 parts |
| White millbase (Example 1 (b)) | 7.40 parts |
| Black millbase (Example 4 (c)) | 2.00 parts |
| Yellow oxide millbase (Example 4 (d)) | 0.70 parts |
| Alkyd resin solution of 43% oil length prepared from soyabean oil/ glycerol/phthalic anhydride (60% solids solution in xylene) | 33.50 parts |
| 2% solution of a silicone oil in xylene | 0.05 part |
| Butanol | 3.00 parts |
| Xylene | 13.35 parts |

3. Beige Thermosetting Acrylic Car Finish

The following paint constituents were added to a stirred container in the order given:

| | | |
|---|---|---|
| Butylated melamine formaldehyde resin solution (67% solids in butanol) | 26.6 | parts |
| White millbase (Example 1 (b)) | 7.05 | parts |
| Yellow oxide millbase (Example 4 (d)) | 0.90 | part |
| Black millbase (Example 4 (c)) | 0.20 | part |
| Red oxide millbase (Example 4 (a)) | 0.05 | part |
| Styrene/ethyl hexyl acrylate/hydroxyethyl methacrylate/acrylic acid copolymer (50% solids solution in xylene) | 52.10 | parts |
| Isobutanol | 3.00 | parts |
| Dipentene | 8.00 | parts |
| Xylene | 2.00 | parts |

4. Green Thermosetting Acrylic Domestic Appliance Finish

The following paint constituents were added to a stirred container in the order given:

| | | |
|---|---|---|
| White millbase (Example 1 (b)) | 13.60 | parts |
| Yellow oxide millbase (Example 4 (d)) | 3.00 | parts |
| Red oxide millbase (Example 4 (a)) | 0.30 | part |
| Red oxide millbase (Example 4 (a)) | 0.30 | part |
| Phthalocyanine blue millbase (Example 4 (b)) | 0.50 | part |
| "Epikote" 1001 (60% solids solution in xylene/butyl "Cellosolve") | 5.90 | parts |
| Butyl "Cellosolve" | 3.00 | parts |
| ("Epikote" and "Cellosolve" are Registered Trade Marks) Methylolated acrylamide thermosetting acrylic resin (50% solids solution in xylene/butanol) | 58.40 | parts |
| Butanol | 3.25 | parts |
| Xylene | 9.70 | parts |

I claim:

1. A pigment dispersion suitable for use in making a series of paints comprising a pigment, an organic liquid and a pigment dispersant which is a copolymer comprising units derived from the following ethylenically unsaturated monomers in the stated proportions by weight based on the total weight of the copolymer:
    a. 0–50% of a hydroxy group-containing monomer, and/or
    b. 0–20% of an amide group-containing monomer, provided that there is always present at least 5% of (a) or (b);
    c. 20–80% of a monomer free from carboxyl groups and containing a straight or branched chain alkyl group of from 7 to 22 carbon atoms, and
    d. a component containing one or more monomers free from the groups mentioned in (a), (b), or (c), said component including as an essential constituent up to 20% based on the total weight of the copolymer of a comonomer containing an epoxide group, said epoxide group having been reacted with a compound bearing a carboxyl group and a pigment dispersant group and having the formula Ar

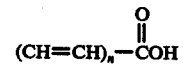

where Ar is an aromatic group and n is 1 or 0, the total amount of said component (d) being up to 50% and the total of monomers being 100%.

2. A dispersion as claimed in claim 1 in which the dispersant copolymer comprises both a hydroxy group-containing monomer (a) and an amide group-containing monomer (b).

3. A dispersion as claimed in claim 1 wherein the hydroxy group-containing monomer is selected from the group consisting of hydroxyethyl acrylate, hydroxyisopropyl acrylate, hydroxyethyl methacrylate and hydroxyisopropyl methacrylate.

4. A dispersion as claimed in claim 1 wherein the amide group-containing monomer is selected from the group consisting of acrylamide and methacrylamide.

5. A dispersion as claimed in claim 1 wherein the comonomer (c) is an alkyl acrylate or methacrylate in which the alkyl group contains from 7 to 22 carbon atoms.

6. A dispersion as claimed in claim 1 wherein the comonomer (d) is selected from the group consisting of alkyl acrylates and methacrylates in which the alkyl group contains from 1 to 6 carbon atoms, styrene vinyl toluene and acrylonitrile.

7. A dispersion as claimed in claim 1 wherein the dispersant copolymer comprises
   a. 15–30% of a hydroxy alkyl methacrylate, or corresponding acrylate, e.g. where alkyl is ethyl, propyl, isopropyl or butyl,
   b. 1–10% of acrylamide or methacrylamide,
   c. 20–80% of $C_7$ or higher alkyl acrylate or methacrylate, and
   d. 10–50% of styrene or vinyl toluene.

8. A dispersion as claimed in claim 1 wherein there is incorporated in said dispersant copolymer not more than 20% based on the total weight of the copolymer of a comonomer (d) which contains a group having pigment dispersant characteristics.

9. A dispersion as claimed in claim 1, wherein the compound is selected from p-aminobenzoic acid and p-nitrobenzoic acid.

10. A method of manufacturing paint which comprises combining the dispersion of claim 20 with a film-forming polymer selected from the group consisting of alkyd/melamine-formaldehyde blends, thermosetting acyrlic/epoxy blends, thermosetting acrylic/melamine-formaldehyde blends, nitrocellulose and acrylic lacquer-type polymers.

11. A paint manufactured according to the method of claim 10.

12. A paint as set forth in claim 11 wherein said film-forming polymer is a different polymer from said disperant.

* * * * *